United States Patent [19]

Takano et al.

[11] Patent Number: 4,883,944

[45] Date of Patent: Nov. 28, 1989

[54] HEATING APPARATUS HAVING AN OPEN-LOOP CONFIGURATION FOR CONTROLLING TEMPERATURE

[75] Inventors: Teruhisa Takano, Osaka; Takahiko Yamasaki; Mitsuo Akiyoshi, both of Nara, all of Japan

[73] Assignee: Matsushita Electric Industrial Co., Ltd., Osaka, Japan

[21] Appl. No.: 211,417

[22] Filed: Jun. 23, 1988

[30] Foreign Application Priority Data

Jun. 23, 1987 [JP] Japan .............................. 62-155902
Jun. 23, 1987 [JP] Japan .............................. 62-155908
Jun. 23, 1987 [JP] Japan .............................. 62-155909

[51] Int. Cl.⁴ ............................................. H05B 1/02
[52] U.S. Cl. ..................... 219/492; 219/494; 219/501; 323/323; 340/589
[58] Field of Search ............... 219/490, 492, 494, 497, 219/501, 505, 10.55 B, 483, 486; 323/319, 318, 323; 340/588, 589

[56] References Cited

U.S. PATENT DOCUMENTS

| | | | |
|---|---|---|---|
| 4,410,795 | 10/1983 | Ueda | 219/506 |
| 4,523,084 | 6/1985 | Tamura et al. | 219/506 |
| 4,705,926 | 11/1987 | Sakai et al. | 219/492 |
| 4,780,588 | 10/1988 | Edamura | 219/10.55 B |

Primary Examiner—M. H. Paschall
Attorney, Agent, or Firm—Wenderoth, Lind & Ponack

[57] ABSTRACT

A heating apparatus measures the operation time and the inoperative time using an operation equation to switch the magnitude of the thermal supply of the heating apparatus in accordance with the calculated values. The heating apparatus includes a heater as a heating thermal supply, a heating chamber to be heated by the heater, a driving device for controlling the supply energies to the heater, a parameter operation device for calculating, in accordance with a given operation equation, the parameter corresponding to the supply energies to the heater, an output deciding device for comparing the parameter operation value obtained by the parameter operation device with the given target value to decide the output level of the heating thermal supply. The parameter operation value is increased in accordance with the given operation equation by the parameter operation device during the energization into the heater, and when the value has reached the given value, the output deciding means increases or cuts off the average power to the heater.

6 Claims, 6 Drawing Sheets

HEATING APPARATUS HAVING AN OPEN-LOOP CONFIGURATION FOR CONTROLLING TEMPERATURE

BACKGROUND OF THE INVENTION

The present invention generally relates to a heating apparatus such as oven or the like. More particularly, the operation time and the inoperative time are counted using an operation equation to switch the magnitude of the thermal supply of the heating apparatus in accordance with the calculated values. The present invention is especially effective in a heating apparatus which combines a face heater comparatively large in thermal capacity with a heater having less thermal capacity, such as quartz tube heater.

Conventionally, in order to keep constant the temperature within the heating chamber, such as oven or the like, a thermistor is used to measure the temperature within the heating chamber. The temperatures are controlled to reduce or cut off the output of the thermal supply such as heater or the like and to energize the heater again. However, the use of the heat sensitive elements involved higher cost and required temperature adjustment of the heat sensitive elements, thus costing much manufacturing labor. Also, the atmosphere temperature of the food placed within the heating chamber caused a lag time due to the heater, the thermal capacity of the heating chamber, the thermal capacity of the food, and so on, so that some corrections are required.

In order to solve the above-described problems, a method of automatically correcting the baking time without the use of temperature sensitive elements is disclosed in Japanese Laid-Open Patent Application Tokkaisho No. 59-298124. This method has an energization storing means, which stores the energization time into the load had so far including the last time, the energization frequency and the non-energization time, to calculate the corrected value of the present energization item by the output of the energization storing means, to reduce the corrected value from the established set time to decide the present energization time so as to flow the current to the load for the decided time.

This method has disadvantages in that the number of the energizations is required to be stored, and more storing capacity is required though the temperature sensitive elements are not required to be used, and large errors are caused because of the number of the energizations, long, short, counted. Also, there is a large disadvantage in that it is impossible for a user to effect the heating operation for longer time, because the apparatus corrects the set time established by the user.

A second problem in the heating apparatus is the thermal-amount balance between a plurality of thermal supplies, for example, an upper-portion heating (a first thermal supply) and a lower-portion heater (a second thermal supply). Especially, when a quartz tube heater is used as a first thermal supply, a flat-shaped heater as a second thermal supply, only one of the heated is burned black with both the thermal supplies being energized for the same period of time, because the calorific amount, thermal capacity of both the thermal supplies, the distance to the heated are respectively different. In order to improve the disadvantages, a method of specifying the ratio of the energization time and effecting the heating operation is conventionally adapted to retain the energization ratio of the upper heater and the lower heater at a predetermined constant value is adopted. However, when the thermal amount of one heater is large, disadvantageously the temperature does not rise so easily. Also, keep large the energization amount to the heater large in thermal amount so as to oppositely quicken the rising speed of the heater temperature, and the difference in temperature between the upper, lower heaters is made large between the first time and the second time because of the large remaining heat of the heater. Even if the balance between the upper and lower heaters is good at the first time, only the single side is burnt at the second time inconveniently.

Also, as the type of foods is different in a toaster for baking bread and a pizza cooker for baking pizza, the output of the respective heaters is required to be charged. As before, the uniform heater output is not capable of handling each cooking menu.

SUMMARY OF THE INVENTION

Accordingly, an object of the present invention is to provide an improved heating apparatus, which includes a heater which becomes a heating thermal supply, a heating chamber to be heated by the heater, a driving means for controlling the supply energies to the heater, a parameter operation means for calculating, in accordance with a given operation equation, the parameter corresponding to the supply energies to the heater, an output deciding means for comparing the parameter operation value obtained by the parameter operation means with the given target value to decide the output of the heating thermal supply, wherein the parameter operation value is increased in accordance with the given operation equation by the parameter operation means during the energization into the heater, and when the value has reached the given value, the output deciding means decreases or cuts off the average power to the heater.

Also, when the average power to the heater is cut off or a given value or less, the parameter calculating means reduced the parameter operation value by the predetermined operating equation. When the heating instructions have been given again by a user of the instrument, such a heater controlling means as to flow the current to the heater again with the parameter operation value of that time point as a starting point to effect the above-described controlling operation.

In the present invention, as the increase and decrease of the parameter operation value corresponding to the temperature is always estimated, the controlling operation which is almost similar to the temperature control using a temperature sensor may be effected.

The temperature of the heating chamber is normally estimated and controlled depending upon the heat quantity given through past energization. Accordingly, the temperature of the heating chamber is controlled by an open loop, instead of the feedback loop using temperature sensitive elements such as thermistors or the like.

Accordingly, a large effect is provided in that the construction is simplified.

BRIEF DESCRIPTION OF THE DRAWINGS

These and other objects and features of the present invention will become apparent from the following description taken in conjunction with the preferred embodiment thereof with reference to the accompanying drawings, in which.

DETAILED DESCRIPTION OF THE INVENTION

Before the description of the present invention proceeds, it is to be noted that like parts are designated by like reference numerals throughout the accompanying drawings.

Figure 1:
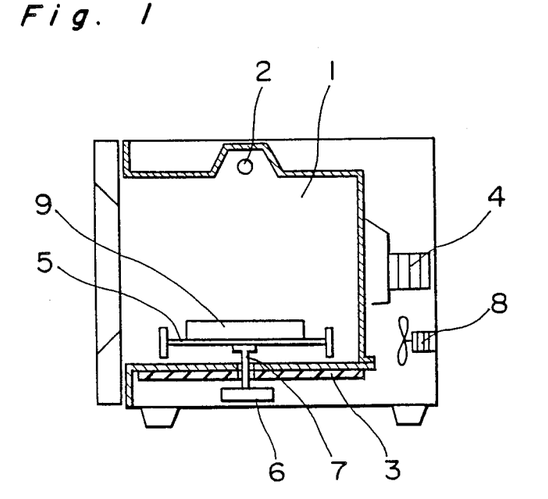
FIG. 1 is a sectional view of essential portions of a heating apparatus in one embodiment of the present invention.

Referring now to the drawings, FIG. 1 shows a sectional view of essential portions according to one preferred embodiment of an oven range for household use in accordance with the present invention, which includes an upper heater 2 composed of heating wires covered by quartz glass in the upper portion of a heating chamber 1, a lower heater 3 composed of a face-shaped heater which is adheringly mounted on the under side of the heating chamber and is large in thermal capacity, a magnetron 4 which is adapted to radiate electromagnetic waves into the heating chamber 1 to heat the food 9 placed on a food placement stand 5, which rotates through engagement with the shaft 7 of the motor 6, a cooling fan 8 for cooling the magnetron 4 or the like. Also, the food placement stand 5 is provided near the lower portion of the heating chamber. Accordingly, in order to improve the baking condition, as when bread is baked for example, it is particularly important to control the temperatures of the lower heater.

Figure 2:
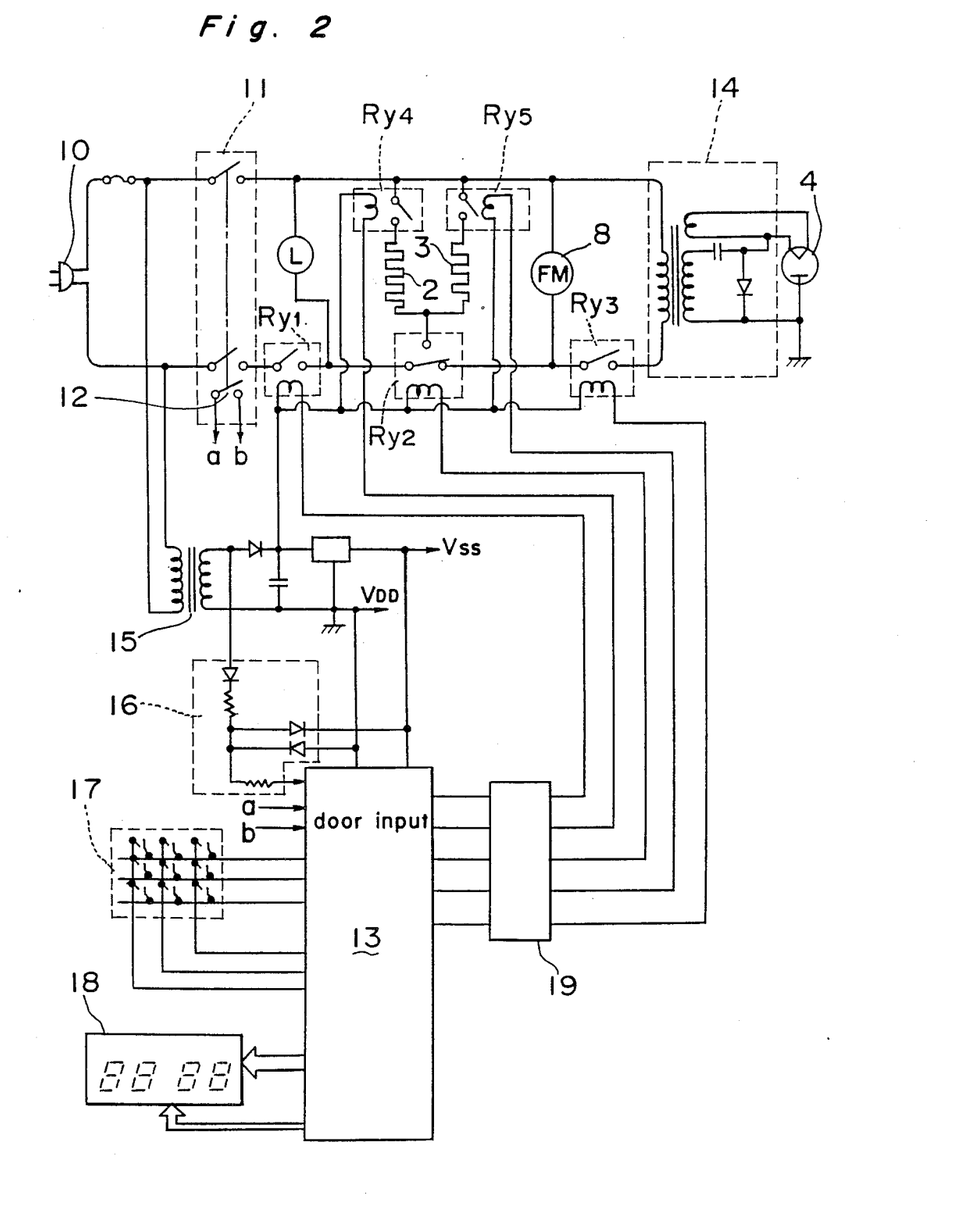
FIG. 2 is a controlling circuit diagram thereof.

Referring to FIG. 2, there is shown a circuit diagram of an oven range for household use, which includes a plug socket 10 for the commercial power supply, door switches 11, with one 12 of them being inputted as a door signal input switch into a microcomputer 13, an upper heater 2 and a lower heater 3, a fan motor 8 for a cooling fan, a high-voltage power supply portion 14 for the magnetron 4, relays $R_{Y1}$ through $R_{Y5}$, whose contacts are opened and closed by an IC 19 for driving use, a low-voltage power supply 15 for the microcomputer 13 and for the relays $R_{Y1}$ through $R_{Y5}$. A program for carrying out a control sequence is stored. Also, a clock signal 16 is connected with a setting means 17 composed of an operation switch, which not only inputs the type of heating sequences, but also instructs the "heating time", heating start, and stop. A display means 18 displays the type of heating sequences and the heating time.

Figure 3:
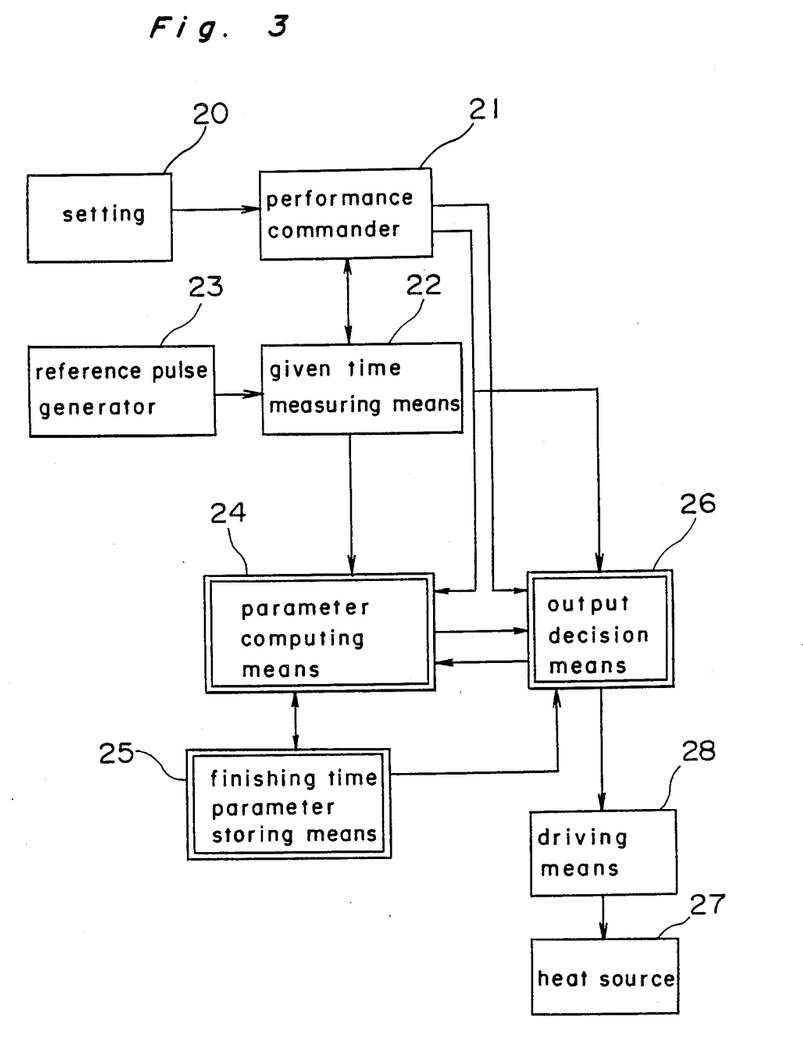
FIG. 3 is a control block diagram thereof.

Referring to FIG. 3, there is shown a block diagram for a controlling portion which is composed of a program in the microcomputer 13. A setting portion 20 provides an operation instructing portion 21 with the heating sequence and heating time established by the setting means 17. The operation instructing portion 21 provides instructions as to the start of the heating operation, the interruption thereof, the completion thereof and so on in accordance with the door signal, the established contents, the heating start input and so on.

A constant time counting means 22 counts the constant time using a reference pulse generating portion 23, which is a clock signal 16 of FIG. 2, as an input so as to give a time signal to the respective block. Also, a parameter calculating means 24 normally calculates and stores the parameter operation value fed to the heater in accordance with a procedure which is described later in detail, and is composed of a memory and a program within the microcomputer 13. A completion time-point parameter storing means 25 is a memory for storing the parameter calculation value calculated by the parameter calculating means 24 at the heating completion and interruption time-point when the door has been operated by a user during the end of the heating time, the canceling operation by the user, or the heating operation.

An output deciding means 26 determines the output of a heat supply (heater) 27 according to the heating sequences and the present parameter calculation values according to the parameter calculating means 24, the signals of the completion time-point parameter storing means 25, the time calculating means 22, etc. The output drives the heat supply through the driving means 28 (drive IC 19).

First characteristics of the construction of the present invention are in that a temperature measuring means does not exist, and a feedback is not contained in the control system.

One embodiment of a heating sequence will be described with reference to FIG. 4 in order to fully describe the operation of each block described hereinabove.

Figure 4:
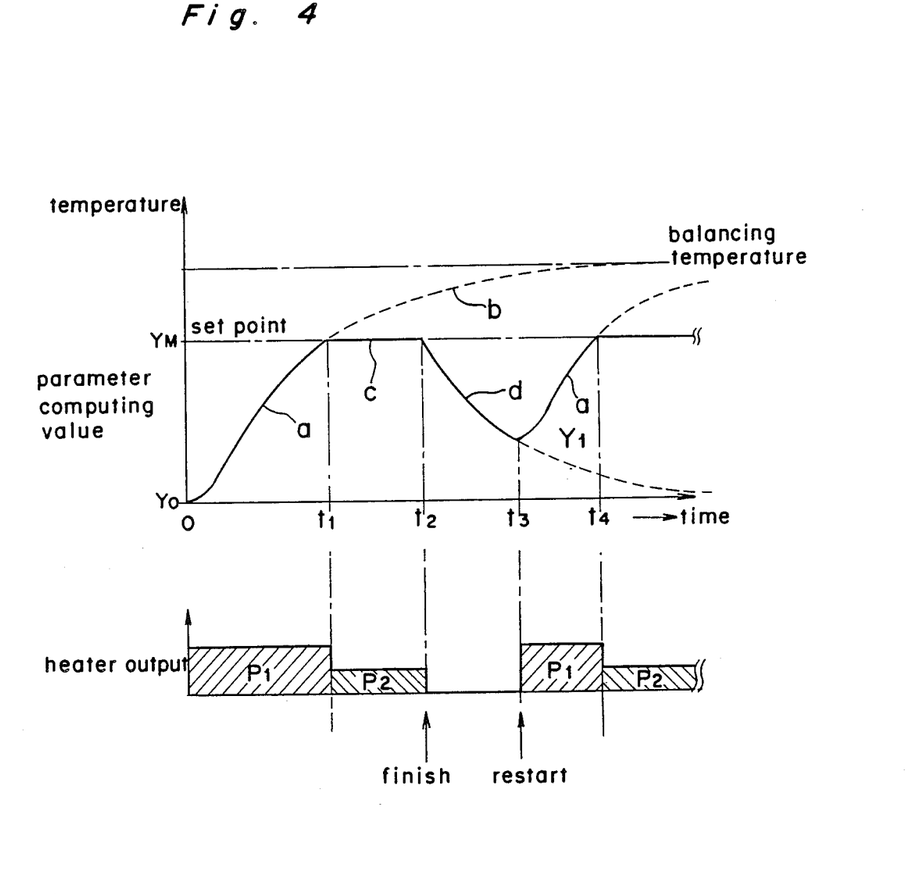
FIG. 4 is an illustrating view showing the variations in the temperature and the thermal-supply output.

FIG. 4 shows the relationship between the time and the temperature of a certain given portion of a heating chamber according to the heater heating operation and one embodiment of the operation of the parameter operation value in accordance with the present invention.

When the heater (thermal supply output) is started to be heated by a constant maximum output P1 such as 1 KW, the heater temperature rises in terms of exponential function having a delay similar to that shown as curve "a" up to time $t_1$. When the heating operation continues at the output P1 after time $t_1$, the heater temperature keeps rising in a fashion similar to the dotted line "b" to arrive at the balance temperature. It may be readily ensured by experiment that the curve becomes approximately definite rising according to the thermal capacity, the food amount, and the temperature within the heating chamber. Since the temperature is required to be kept constant at a predetermined set temperature in the actual temperature control, the thermal supply output can be lowered to P2 from P1. Thus, the temperature C is balanced at $Y_M$, shown as line "c" and may therefore be made constant.

The choice of these outputs levels may be obtained by the experiment. When no power is supplied, the temperature C decreases in terms of exponential function like a curve "d".

The basic point of the present invention is that the necessary temperature control may be performed even if a feedback loop is not provided using a temperature sensor if the physical phenomenon like this is simulated by the use of a logical analysis formula.

According to the present invention, a variable value corresponding to variation in the temperature as described hereinabove, namely, a state amount called parameter operation value Y is normally calculated so as to reduce the output of the heater at a time point when the parameter operation value Y has reached a predetermined value $Y_M$.

One embodiment of the present invention will be described with reference again to FIG. 4. The variation in temperature becomes equal to the actual temperature variation if functions are used which simulate the variation in actual temperature, so that functions approximate to curves a, c, d in FIG. 4 become a(t), c(t), d(t) respectively. Assume that a parameter operation value Y at time t is an initial value Yo at time 0. When the heating operation is continued at the heater output P1 and the parameter operation value Y becomes as follows: Y=a(t). At $Y=a(t_1)=Y_M$, the parameter operation value Y becomes equal to to the predetermined set value $Y_M$ at the time $t_1$. At this time point, the heater output is lowered to the level P2. After that, the Y is calculated as c(t). At the time $t_2$, the set operation time is completed to finish the heating operation. As the heating is at a stop during the time between $t_2$ and $t_3$ after, the parameter operation value Y is calculated by the function d(t). When the heating operation is opened again at the time $t_3$, the heater output is operated again at the highest output P1 with the parameter operation value Y at this time point being $Y=d(t_3)=Y_1<Y_M$, the parameter operation value is calculated by the function a(t) corresponding to it, and the heater output is switched to the lower value (P2) at the time $t_4$ with the set value being $Y_M$. The above description shows one embodiment of a basic controlling method of the heater output in accordance with the present invention.

Namely, the parameter operation value Y introduced by the present invention is normally operated by a predetermined operation equation and the heater output is adapted to be switched at a time point the value has reached the predetermined set value $Y_M$.

As the parameter operation value may be operated all the time, the operation time, the inoperation time or the repetition frequency provided so far are not required to be counted at all.

Figure 5:
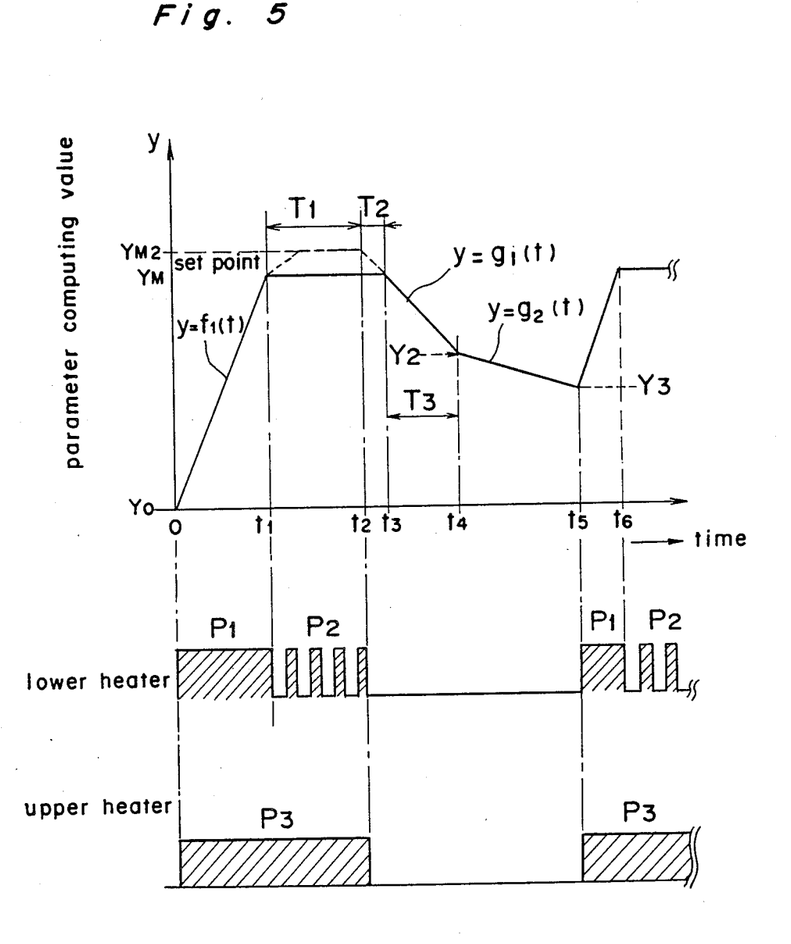
FIG. 5, and FIG. 6 are illustrating views each showing the parameter operation value.

FIG. 5 shows the other embodiment of the present invention. The controlling operation of FIG. 5 shows one embodiment, in which the lower heater is controlled by the use of a parameter operation value of the present invention in a toaster operation for baking, the bread through the use of a toaster electronic range shown in FIG. 1.

In the present embodiment, a function which gives a parameter operation value is a straight line. During a heating operation by a heater output P1, the parameter operation value Y is as follows.

$$Y=f_1(t)=At+B \quad (1)$$

wherein A is a predetermined constant, t is time, B is an initial value.

The above described curve d is approximated by two straight lines of $$Y=g_1(t)=-Ct+D \quad (2)$$

during the heating stop, when the parameter operation value is $Y_2$ or more (or when the period is $T_3$ or less).

$$Y=g_2(t)=-Et+F \quad (3)$$

when the parameter operation value is $Y_2$ or less (or when the inoperation period is $T_3$ or more), wherein $-C$, $-E$ are predetermined constants, t is time, B, D, F are respective initial values, $Y_2$ is a predetermined constant.

When the toaster heating operation is started at the time 0, the continuous energization is effected by the output P3, because the upper heater is a quartz pipe heater and is placed in a position away from the top portion of the bread.

Since the lower heater is large in its thermal capacity, the continuous energization is effected to start the heating operation as the output P1. At this time, the parameter operation value Y is calculated by the straight line of a slope A given by equation (1) with the initial value B as $Y_o$. Thus, the increases corresponding to the slope A are added with $Y_{t=1}=A+Y_o$ after one second and $Y_{t=2}=Y_{t=1}+A$ after two seconds. Accordingly, the characteristics are that the operation continuous time is not required to be memorized at all and all that is necessary is to calculate and memorize the above-described parameter operation value.

As the parameter operation value $Yt=t1$ at the time of the time t1 has reached the predetermined set value $T_M$, the output of the lower heater is reduced to P2. As shown, the output is reduced discontinuous operation of the lower heater. For example, the heater is turned on for 20 seconds and then turned off for 20 seconds to have the output half as much as the maximum output P1.

Even at this time point, the upper heater is continuously operated. The heat from the upper heater away from the bread and the heat from the lower heater provided near the bread may be balanced in this manner, so that the baking color of both the upper and lower faces of the bread may be made approximately equal.

Until the operation time t2 is established by the user, the lower heater is continuously operated by the output P2 and the parameter operation value Y is retained at the set value $Y_M$. Needless to say, as shown by the dotted line, the parameter operation value is calculated using the other function even after the output of the heater has been switched so that the parameter operation value may be retained at $Y_{M2}$ at a time point when another set value $Y_{M2}$ has been reached. As the operation is completed at the time t2, both the upper and lower heaters complete the energization. The parameter operation value Y is retained at $Y_M$ for the T2 period after the completion. This is because the remaining heat sufficiently remains. The T2 period may be determined with reference to the period T1 for which the lower heater output has been operated at P2. When the T1 period is, for example, 10 minutes or more, T2 may be determined to be two minutes, because the remaining heat becomes conversely smaller with the output P2 being set smaller, T2 may be made 0 or the like when T1 is more than 10 minutes or more. After the T2, the parameter operation value is calculated using the operation equation shown in the above-described equation (2). Namely, at the t3 time point, $Y=Y_M$, while at the t3+1 second time point, $Y=Y_M-C$. Similarly, subtraction is required to be effected for every given time. After the parameter operation value Y has become the predetermined value $Y_2$ or lower, the calculation is effected as $Y=Y_{t-1}-E$ using the operation equation shown in the above-described equation (3). Also, when the parameter operation value has become a given value or less, the initial value Yo is set again. The inoperation time and the inoperation frequency are not at all required to be stored in memory during the inoperation as during the above-described heating operation.

In FIG. 5, the parameter operation value Y is assumed to have been Y3 at the time t5. Assume that the toaster heating is started again by the user at this time point, and both the upper, lower heaters start to be continuously energized. The parameter operation value is increased by an amount corresponding to slope A for every second with Y3 being the initial value B, and the output of the lower heater is switched to P2 at a time point when the value has become $Y_M$, in the controlling operation similar to the above description.

When the functions giving the parameter operation values are given by straight lines, all that is necessary is to add the predetermined values A, −C, −E for each constant time.

As seen from FIG. 5, when the lower heater stops for a constant time after being switched to the P2, and thereafter is restarted, the time for which the output P1 is continued is constant. This is the reason why the start is normally made from the same initial value, because the parameter operation value Y at a time point, when the inoperation is provided for a given time and the reheating operation starts, because also constant (for example, Y3) as the parameter operation value of the inoperation time point is as constant as $Y_M$. Accordingly, the repetition frequency is not related at all. Needless to say, it is possible to respectively vary and use the above-described functions by the repetition frequency.

Figure 6:
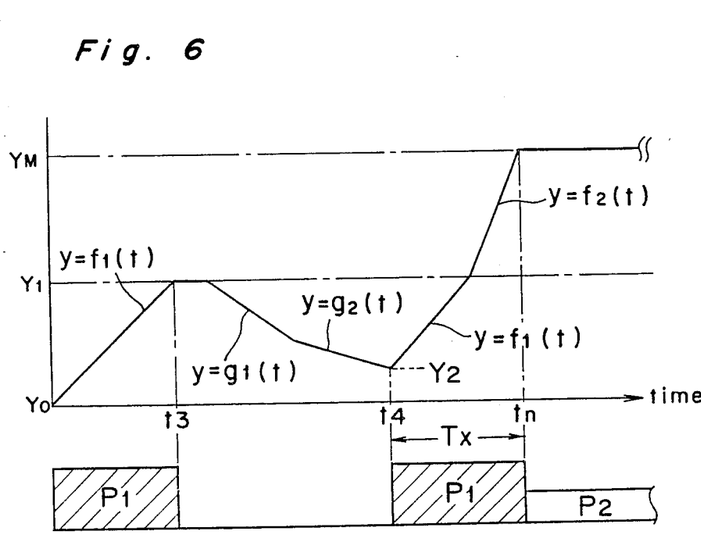

FIG. 6 shows a further advanced other embodiment.

FIG. 6 shows the time when the first heating operation is started as in FIG. 5 and is completed or interrupted at the time t3. At this time, the parameter operation value Y is assumed to be calculated by the operation calculation of $Y=f_1(t)$, with the value being, for example, Y1. Thereafter, as it is left as it is until the time t4, the parameter operation value Y is reduced as far as Y2 as shown in FIG. 5. When the heating instructions are given at this time point, the heating operation is effected by the heating output P1 as at the beginning thereof. Though the parameter operation value Y is calculated by the function of $Y=f_1(t)$ likewise and is added. After the value has become equal to the parameter operation value Y1 of the completion time point described hereinabove, the parameter operation value is calculated using the second increase function $Y=f_2(t)$ with the driving operation being effected with the same heating output before the value reaches a certain given value $Y_M$.

The time Tx for which the heater output P1 is continued with the straight line of the slope A given in the above-described equation 1 being provided as the function $f_1(t)$, the straight line of the slope 3A as $f_2(t)$ is as follows.

$$Tx=(Y_M-Y_1)/3\cdot A + (Y_1-Y_2)/A$$

Assume that the heater is operated by the output P1 until the parameter operation value reaches the $Y_M$ with $f_1(t)$ only, and the continuous time $T_Y$ becomes $T_Y=(Y_M-Y_2)/A$, becomes longer than the Tx, with the result being that the heat of the lower heater becomes more to strongly bake the lower heater side of the bread. In order to remove this disadvantage, the present invention shortens the continuous time of the heater output P1 using the second function as described hereinabove.

In the described embodiment, the calculation was effected with $f_1(t)$ until the parameter operation value becomes equal to the parameter operation value of the completion time-point, and thereafter was effected with $f_2(t)$. Conversely, the calculation may be effected with $f_2(t)$ until it becomes equal to the parameter operation value of the completion time-point and thereafter is effected with $f_1(t)$. Alternatively the new $f_3(t)$ may be introduced. As a result, the time is required to be shorter than the time to be calculated with the initial rising $f_1(t)$.

Even though the functions which give the above-described parameter calculation value are required to be considered to be respectively different depending upon cooking type such as toast, pizza or electronic range heating, according to our experiment, the result is provided that the heater power supply may be considered inoperative in the case of the electronic range.

Also, the calculation of the parameter operation value is required to be performed even in the case of the pizza, with the lower heater being heated, as in the case of the toast. The output of the lower heater may be better to be different in the case of the toast. When the operation equations of the respective parameter operation values are varied correspondingly, a more precise control may be effected.

As the respective heater radiation amount are different depending upon the open door of the heating chamber or the closed door thereof even during the inoperative heating, the finer controlling operation may be effected through the variation in the operation equation which given the parameter operation values in accordance with the respective cases.

Figure 7:
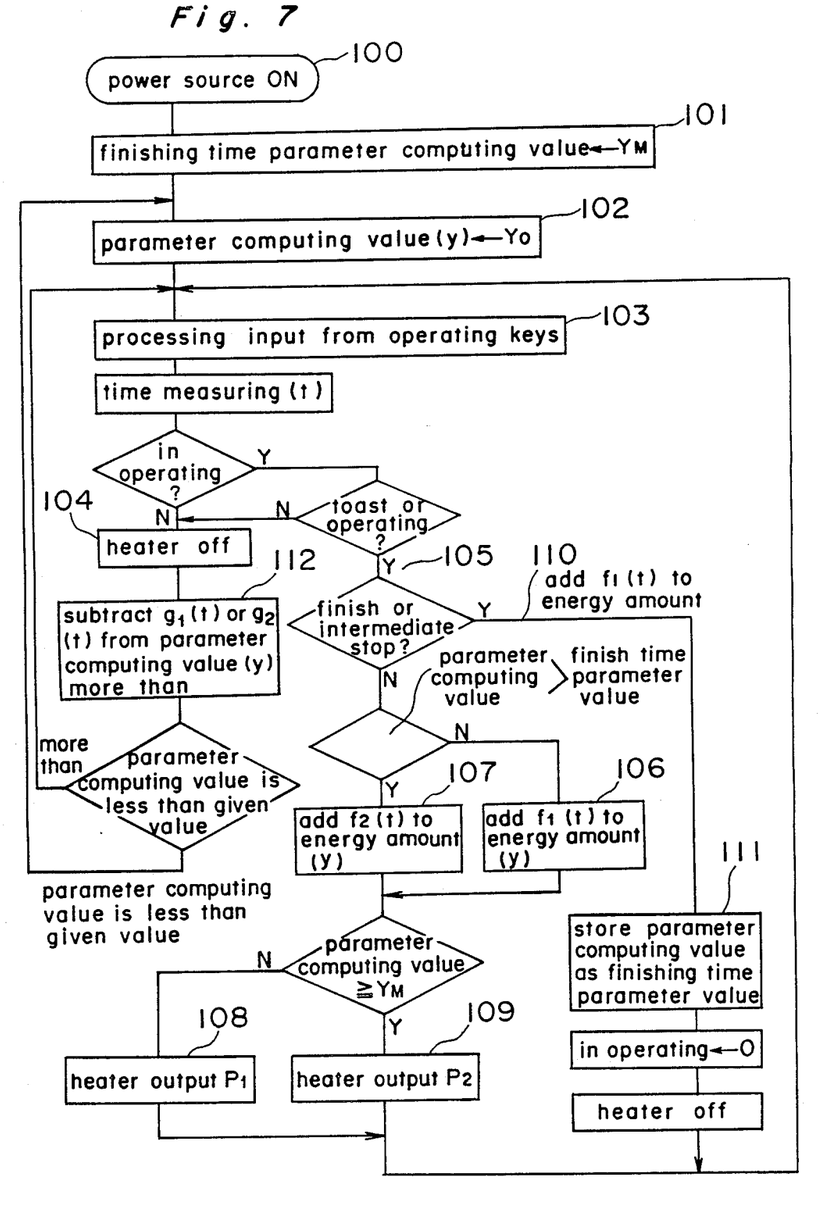
FIG. 7 shows one embodiment of a flow chart for realizing a parameter-operation method in one embodiment of the present invention shown in FIG. 6.

When the above-described present invention is embodied, it is required to be realized as the program of the microcomputer. One embodiment of the flow chart of the program is shown in FIG. 7. FIG. 7 shows an essential portions flow chart for controlling one embodiment of the present invention shown in FIG. 6 with respect to the lower heater between two heaters, i.e., the upper heater provided in the upper portion of the heating chamber and the lower heater provided in the lower portion thereof in a so-called toaster range realizing two functions of electronic range and toaster as one heating apparatus.

The power supply is activated (100) and the predetermined set value $Y_M$ is stored (101) as a parameter operation value of a completion time point. The parameter operation value Y is calcuated by the above-described calculation equation for every given time, with the predetermined value Yo being stored in memory (102) as the initial value. Here $Y_M>Y_o$.

The operation is started by an inputting operation (103) from an operation key and becomes an in-operation. Even during the operation, except the toast operation, i.e., in the case of the electronic range operation, the heater is not energized, so that things are handled as inoperative (104).

During the toast operation (105), the parameter operation value Y is increased according to $f_1(t)$ (106) or $f_2(t)$ (107). The heater output becomes P1 (108) before the value becomes the predetermined set value $Y_M$. When the heater output is more than the P1, the heater output is reduced as P2 (109).

During the operation, the operation set-time passes or the door of the heating chamber is opened during the operation to complete or interrupt the operation (110), so that the parameter operation value at that time point is stored in memory (111) as the parameter value of the completion time point.

During the inoperation (104), the parameter operation value Y is calculated (112) using $g_1(t)$ or $g_2(t)$, with the result being that Yo is initialized again when the value of Y is a given value or less. The initialization may be effected when the inoperative time has elapsed more than given time.

As described hereinabove, according to the present invention, even in both the operation of the heater and the inoperation thereof, a certain value, i.e., a parameter operation value is calculated in accordance with an opening equation specified in the respective cases of the operation and the inoperation. During the operation, the output of the heater is reduced at a time point when the parameter operation value has reached the predetermined given-value (set value). Accordingly, the operation time may be freely set by the user and the temperature may be controlled or the thermal balance among a plurality of heaters may be made almost equal. In this case, only one of the heaters may be desired to be calculated as described hereinafter.

As is clear from the foregoing description, according to the arrangement of the present invention, in the heating apparatus for controlling the switching operation, from maximum to minimum, of the heater output of the heating apparatus using an electric heater, the following effects are provided.

(1) Construction may be made simpler and lower in price without the use of temperature sensitive elements such as thermistors or the like.
(2) As the energy amount stored by the past heating is estimated, the correct control may be effected.
(3) The operation may be performed only by time measuring and simple operating equation.
(4) The outputs of the respective heaters are controlled individually when a plurality of heaters such as upper heater, lower heater and so on are provided, and the thermal distribution may be made equal.
(5) The outputs of the heaters are varied by the cooking types, so that the optical thermal distributions for the respect cooking types may be provided.
(6) The operating equation for calculating the parameter operation values may be varied according to the types of the cookings, so that the more correct controlling operation may be effected.
(7) As all that is necessary is to calculate the parameter operation value all the time, the previous operation time, the inoperative time, repetition frequency and the like are not required to be stored in memory so that the memory capacity of the memory apparatus may therefore by reduced.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A device for controlling a heating apparatus having a heating chamber, said device comprising:
an electrical power source for outputting a first power source level and a second power source level which is different from said first power source level, said electrical power source driving a heating element of said heating apparatus;
a setting means for setting a predetermined chamber temperature value and a cooking operation time;
a time counting means for counting and storing a first operation time period in which said heating element is driven at said first power source level, and for counting and storing a second time period in which said heating element is driven at said second power source level, and for counting and storing a stop time period in which said heating element is driven at a power level substantially equal to zero;
an equation storing means for storing a first calculating equation representing a relationship during said first operation time between a change in chamber temperature and a unit of time in which said chamber temperature increases during said first operation time, and for storing a second calculating equation representing a relationship during said second operation time between a change in said chamber temperature and a unit of time in which said chamber temperature remains constant at said predetermined chamber temperature value during said second operation time, and for storing a third calculating equation representing a relationship during said stop time period between a change in said chamber temperature and a unit of time in which said chamber temperature decreases during said stop time period;
an output deciding means for selectively driving said heating element at one of said first output level and said second output level in accordance with said first, second and third calculating equations;
wherein said output deciding means determines an initial chamber temperature on the basis of said third calculating equation and a duration of said stop time period, and wherein said output deciding means drives said heating element at said first output level and determines when said predetermined chamber temperature level has been reached on the basis of said first calculating equation and said initial chamber temperature.

2. An apparatus for controlling a heating apparatus having a heating chamber, said apparatus comprising:
an electric power source outputting a first power source level and a second power source level, said electric power source for driving a heating element of said heating apparatus;
a setting means for setting a predetermined chamber temperature value and a cooking operation time;
a time counting means for counting and storing a firs operation time period in which said heating element is driven by said first power source level, and for counting and a storing a second time period in which said heating element is driven by said second power source level, and for counting and storing a stop time period in which said heating element is driven at a power level substantially equal to zero;
an equation storing means for storing a plurality of equations representing a relationship between a change in chamber temperature and a unit of time for each of said first operation time period, said second operation time period, and said stop time period;
an output deciding means for selectively driving said heating element at one of said first output level and said second output level in accordance with said plurality of equations;
a terminating value storage means for storing a calculated parameter value representing a chamber temperature at a termination of operation of said heating apparatus on the basis of said plurality of equations and said first operation time period, said second operation time period, and said stop time period;

wherein said output deciding means determines an initial chamber temperature on the basis of said plurality of equations, a duration of said stop time period and said calculated parameter value, and wherein said output deciding means drives said heating element such that said chamber temperature increases to said predetermined chamber temperature value and determines when said predetermined chamber temperature level has been reached on the basis of said plurality of equations and said initial chamber temperature.

3. An apparatus as claimed in claim 2, wherein said output deciding means operates in accordance with said plurality of equations which include a first calculating equation representing a relationship during said first operation time between a change in chamber temperature and a unit of time in which said chamber temperature increases during said first operation time, and a second calculating equation representing a relationship during said second operation time between a change in said chamber temperature and a unit of time in which said chamber temperature remains constant at said predetermined temperature value during said second operation time, and a third calculating equation representing a relationship during said stop time period between a change in said chamber temperature and a unit of time in which said chamber temperature decreases during said stop time period.

4. An apparatus for controlling a heating apparatus having a heating chamber, said apparatus comprising:
an electric power source outputting a first power source level and a second power source level different from said first power source level, said electric power source for driving a heating element of said heating apparatus;
a setting means for setting a predetermined chamber temperature value and a cooking operation time;
a time counting means for counting and storing a first operation time period (To) in which said heating element is driven by said electric power source, and for counting and storing a second time period (Ts) in which said heating element is not driven by said electric power source;
an equation storing means for storing equations representing a relationship between a change in chamber temperature and a unit of time for each of said first operation time period (To) and said second operation time period (Ts);
an output deciding means for selectively driving said heating element at one of said first output level and said second output level in accordance with said equation said first operation time period (To), said second operation time period (Ts), and said predetermined chamber temperature value;
a terminating value storage means for storing a calculated parameter value representing a chamber temperature at a termination of operation of said heating apparatus on the basis of said equations and said first operation time period (To), and said second operation time period (Ts);

wherein said equations are expressed as $y=f(To)$ and $y=f(Ts)$, y being a parameter operating temperature value, wherein said output deciding means cuts off power to said heating element when said parameter operating temperature value calculated according to said equation $y=f(To)$ becomes larger than said predetermined chamber temperature value, and wherein said output deciding means calculates an initial temperature value on the basis of said calculated parameter value, said second operation time period (Ts), and said equation $y=f(Ts)$, and wherein said output deciding means drives said heating element by said electric power source according to said initial temperature value and said equation $y=f(To)$.

5. An apparatus for controlling an electric power source of a heating apparatus, comprising:
a heating means for heating a chamber provided in said heating apparatus;
an output control means for controlling an output of said heating means;
a setting means for setting operating parameters of said heating means;
a heating interruption detecting means for detecting an interruption of an operation of said heating means; and
an operating means for sending an operating signal to said output control means in accordance with said operating parameters, said operating means including a time measuring means for measuring a non-operating time period and an operating time period of said heating means, and further including a function storing means for storing first, second, and third functions each representing different relationships between a change in chamber temperature and a duration of time;
wherein said operating means outputs operating signals to operate said heating means at a first output level for a time period in accordance with said first function and said operating parameters, and, thereafter, outputs operating signals to operate said heating means at a second output level for a time period in accordance with said second function, and wherein at a termination of an interruption detected by said heating interruption detecting means, said operating means outputs operating signals to operate said heating means at said first output level for a time period in accordance with said third function.

6. An apparatus claimed in claim 5, wherein said operating means operates in accordance with said first through third functions such that a chamber temperature increase per unit of time is greater as represented by said third function than as represented by said first function.

* * * * *